(12) United States Patent
Braun et al.

(10) Patent No.: US 12,135,536 B2
(45) Date of Patent: Nov. 5, 2024

(54) METHOD, SYSTEM AND COMPUTER PROGRAM PRODUCT FOR MONITORING A SHAPING PROCESS

(71) Applicant: ENGEL AUSTRIA GmbH, Schwertberg (AT)

(72) Inventors: Patrick Braun, Ghent (BE); Herwig Koppauer, Linz (AT)

(73) Assignee: ENGEL AUSTRIA GMBH, Schwertberg (AT)

( * ) Notice: Subject to any disclaimer, the term of this patent is extended or adjusted under 35 U.S.C. 154(b) by 378 days.

(21) Appl. No.: 17/843,082

(22) Filed: Jun. 17, 2022

(65) Prior Publication Data
US 2022/0404792 A1  Dec. 22, 2022

(30) Foreign Application Priority Data
Jun. 21, 2021 (AT) .............. A 50505/2021

(51) Int. Cl.
*G05B 19/18* (2006.01)
*G06N 5/02* (2023.01)

(52) U.S. Cl.
CPC ............ *G05B 19/182* (2013.01); *G06N 5/02* (2013.01); *G05B 2219/45244* (2013.01)

(58) Field of Classification Search
CPC ........ G05B 19/182; G05B 2219/45244; G05B 19/41875; G05B 2219/32194; G06N 5/02; B29C 2945/76936; B29C 45/7686; B29C 45/766; B29C 45/76; B29C 2948/92009; G06Q 10/06395
See application file for complete search history.

(56) References Cited

U.S. PATENT DOCUMENTS

| | | | | |
|---|---|---|---|---|
| 4,654,066 | A * | 3/1987 | Garcia ................. | C03B 9/3816 65/29.21 |
| 7,216,005 | B2 * | 5/2007 | Shioiri ................. | B29C 45/766 706/14 |
| 9,097,565 | B2 * | 8/2015 | Beaumont ............. | B29C 45/76 |
| 9,746,985 | B1 * | 8/2017 | Humayun ............. | G06F 16/904 |
| 10,503,347 | B2 * | 12/2019 | Humayun ............. | G16H 40/20 |
| 10,618,202 | B2 * | 4/2020 | Maruyama ............ | G06N 20/00 |
| 11,592,807 | B2 * | 2/2023 | Tamaki ................ | G06F 18/24 |

(Continued)

FOREIGN PATENT DOCUMENTS

DE          195 14 535      10/1996

*Primary Examiner* — Ramesh B Patel
(74) *Attorney, Agent, or Firm* — Wenderoth, Lind & Ponack, L.L.P.

(57) ABSTRACT

A method for monitoring a molding process carried out in cycles includes determining at least two nearest neighbors in the form of cycle data from at least two past cycles, such that the cycle data of the at least two nearest neighbors lie nearer to the current cycle data than the cycle data which do not pertain to the at least two nearest neighbors. Only those past cycles for which quality data are contained in the data collection are used for the determination of the at least two nearest neighbors. A predictability criterion is checked to determine whether a quality variation of the quality data of the cycles of the at least two nearest neighbors is smaller than a maximum variation and/or larger than a minimum variation. If the predictability criterion is not met, a first notification that a quality and/or a quality datum of the molded part is not reliably predictable is issued.

22 Claims, 4 Drawing Sheets

(56) References Cited

U.S. PATENT DOCUMENTS

Figure 1:
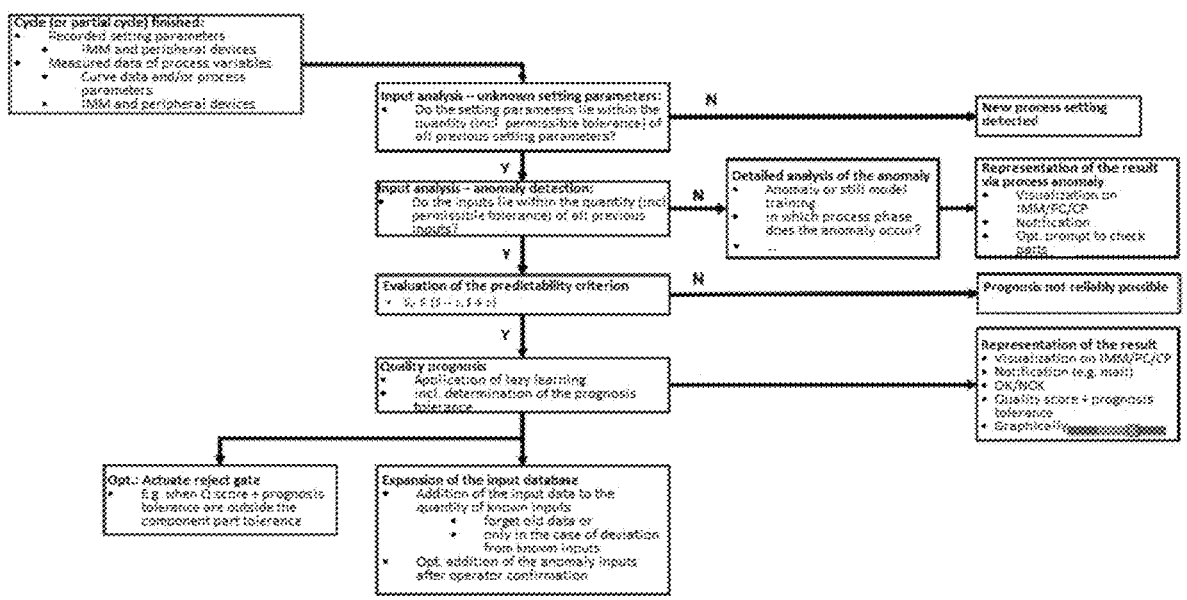

| | | | | |
|---|---|---|---|---|
| 2006/0224540 | A1* | 10/2006 | Shioiri | B29C 45/766 |
| | | | | 706/23 |
| 2007/0078528 | A1* | 4/2007 | Anke | G07C 5/006 |
| | | | | 700/79 |
| 2013/0255371 | A1* | 10/2013 | Beaumont | B29C 45/77 |
| | | | | 73/196 |
| 2015/0106912 | A1* | 4/2015 | Brandon | H04Q 9/00 |
| | | | | 726/13 |
| 2017/0028593 | A1* | 2/2017 | Maruyama | B29C 37/0096 |
| 2017/0307495 | A1* | 10/2017 | Corbett | G01N 15/0211 |
| 2017/0322682 | A1* | 11/2017 | Humayun | G16H 40/20 |
| 2021/0008774 | A1* | 1/2021 | Kruppa | G05B 23/0218 |
| 2021/0318672 | A1* | 10/2021 | Tamaki | G06V 10/44 |
| 2023/0347564 | A1* | 11/2023 | Wollny | B29C 45/7693 |
| 2024/0126244 | A1* | 4/2024 | Furokawa | G06Q 50/04 |

* cited by examiner

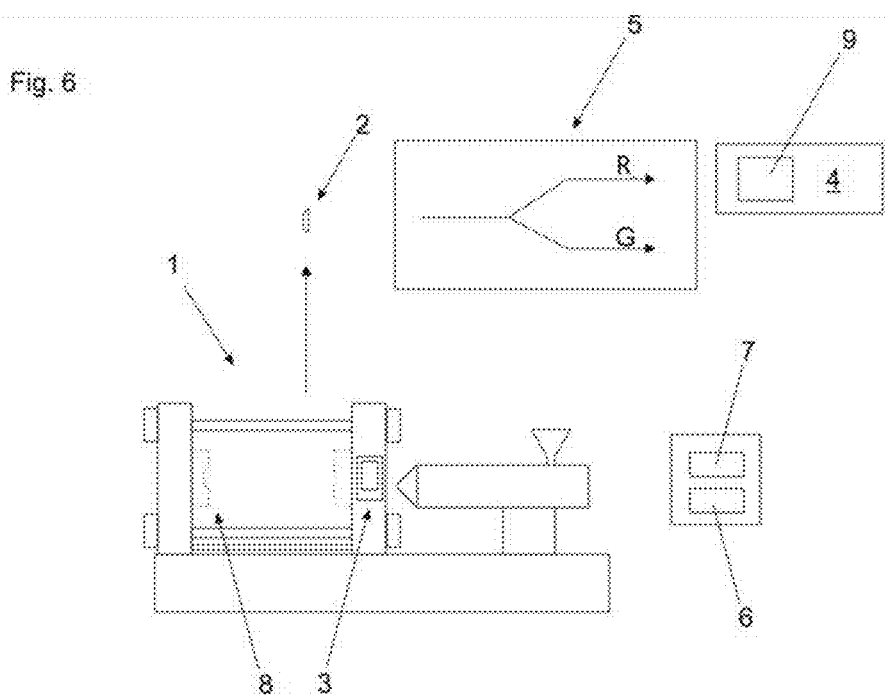

METHOD, SYSTEM AND COMPUTER PROGRAM PRODUCT FOR MONITORING A SHAPING PROCESS

The present invention relates to methods for monitoring a molding process, carried out in cycles, according to the features of the preamble of claim 1 or of claim 10 as well as computer program products for monitoring a molding process, carried out in cycles, according to the features of the preamble of claim 19 or of claim 20.

Methods are known wherein at least the following data are provided in a data collection:
- in each case cycle data of the molding process carried out on a molding machine for past cycles and
- quality data from molded parts produced using the molding machine for at least some of the past cycles.

During the further operation of a molding machine for carrying out the molding process, at least one further cycle of the molding process is carried out, wherein cycle data are again accumulated, which are referred to as current cycle data in the present document.

It is known to use these data in order to make a prediction about the quality of the molded parts produced in the current cycle. In principle, monitoring of the molding process can thereby be realized, which is to react for example when there is the danger that rejects will be produced or are already being produced.

A wide variety of approaches are known for calculating or determining this prediction. DE 112011103778 T5 discloses the use of a multivariate model for controlling an injection molding process. DE 102017104884 A1 discloses the monitoring of a process on the basis of fault patterns. DE 102018102299 A1 discloses an optical inspection system for capturing features of injection molded parts.

Disadvantages of the systems known in the state of the art are that either a great deal of effort must be made to provide inspection systems or no effective monitoring is ensured, because the predictions of the quality of the molded part are not good enough.

In particular in the case of injection molding processes, the prediction of the quality of the molded part is far from trivial, not only because injection molding processes are complex and non-linear per se, but also because injection molding processes are subject to many changes in reality. For example, a change in the external temperature or slight changes in the settings of the molding machine already lead to changes which are clearly reflected in the measured values obtained on the machine. However, it is notable that such changes often do not have a negative effect on the molded part produced. Instead, an altered process can often simply continue because good parts are further produced.

The challenge in such molding processes is thus to recognize whether changes in the process have negative effects on the quality of the molded part, which proves to be difficult in practice. Models with simulations can often be adjusted to the minute changes which occur in the real machine only with difficulty. For reliable predictions, most statistical models require large amounts of data, which are not present in the vast majority of cases, particularly at the start of production.

The object of the invention is therefore to provide a method and a computer program product which enable improved monitoring of a molding process.

With respect to the method, the object is achieved on the one hand by the features of claim 1, namely by the following steps:

- determining at least two nearest neighbors in the form of the cycle data from at least two of the past cycles, such that the cycle data of the at least two nearest neighbors lie nearer to the current cycle data than the cycle data which do not pertain to the at least two nearest neighbors, wherein only those past cycles for which quality data are contained in the data collection are used for the determination of the at least two nearest neighbors,
- checking a predictability criterion, wherein it is checked whether a quality variation of the quality data of the cycles of the at least two nearest neighbors is smaller than a maximum variation and/or larger than a minimum variation and,
- if the predictability criterion is not met, issuing a first notification that a quality and/or a quality datum of the molded part produced with the at least one further cycle is not reliably predictable.

On the other hand, the object is achieved with respect to the method by the features of claim 10, namely by checking, in the context of an anomaly check, whether the current cycle data constitute an outlier and, if this is the case, carrying out at least one of the following steps for at least one subsequent cycle—preferably several subsequent cycles:
- activating a device for gathering quality data and/or
- prompting an operator to gather the quality data and/or
- actuating a reject gate and/or
- depositing at least one molded part produced in the at least one further cycle in an inspection tray and/or
- marking at least one molded part produced in the at least one further cycle.

With respect to the computer program product, the object is achieved on the one hand by the features of claim 19, namely in that the computer program product contains instructions for carrying out the following steps:

- determining at least two nearest neighbors in the form of the cycle data from at least two of the past cycles, such that the cycle data of the at least two nearest neighbors lie nearer to the current cycle data than the cycle data which do not pertain to the at least two nearest neighbors, wherein only those past cycles for which quality data are contained in the data collection are used for the determination of the at least two nearest neighbors,
- checking a predictability criterion, wherein it is checked whether a quality variation of the quality data of the cycles of the at least two nearest neighbors is smaller than a maximum variation and/or larger than a minimum variation and,
- if the predictability criterion is not met, issuing a first notification that a quality and/or a quality datum of the molded part produced with the at least one further cycle is not reliably predictable.

On the other hand, the object is achieved with respect to the computer program product by the features of claim 20, namely in that the computer program product contains further instructions for carrying out the following steps:
- carrying out an anomaly check, wherein it is checked whether the current cycle data constitute an outlier and,
- if this is the case, initiating at least one of the following steps for at least one subsequent cycle—preferably several subsequent cycles:
- activating a device for gathering quality data and/or
- prompting an operator to gather the quality data and/or
- actuating a reject gate and/or
- depositing at least one molded part produced in the at least one further cycle in an inspection tray and/or marking at least one molded part produced in the at least one further cycle.

A fundamental aspect of the invention is not only that the available data are used to create a prediction of the quality of the currently produced molded part, but also that it is checked—preferably first of all—whether an appropriate prediction is possible at all with the available data, thus the checking of a predictability criterion.

In particularly preferred embodiment examples, for example a check of the quality of the molded part produced can be requested when the predictability criterion is not met.

In a variant of the invention, the predictability criterion need not be checked directly. Namely, in many cases a very similar effect can be achieved by carrying out an anomaly check known per se in conjunction with a subsequent check of the quality of the molded part produced (gathering of quality data) because, although the predictability is not directly checked through the provision of or at least the request for the quality data, at least the data which enable the predictability to be checked are provided or requested.

This provision of or request for the quality data can be effected in various ways, namely by
   activating a device for gathering quality data and/or
   prompting an operator to gather the quality data and/or
   actuating a reject gate and/or
   depositing at least one molded part produced in the at least one further cycle in an inspection tray and/or
   marking at least one molded part produced in the at least one further cycle.

In other words, the quality data are to be gathered in any conceivable way or the information that the quality data are to be gathered is to be disseminated.

According to the invention, neither is it necessary to use complex systems for the continuous, direct monitoring of the quality of the currently produced molded part nor must an effective monitoring of the molding process be dispensed with completely.

A further advantage of the invention is that it can be implemented in a relatively simple manner by checking the predictability simply on the basis of data from the cycles carried out earlier which lie as near as possible to the current cycle, i.e. through the use of the cycle data of the cycles of the at least two nearest neighbors.

The maximum variation and the minimum variation can in each case be regarded as limit values. If the quality variation of the quality data of the cycles of the at least two nearest neighbors lies below the minimum variation and/or above the maximum variation, a reliable prediction of the quality of the molded part produced in the at least one further cycle cannot be expected. If the variation is too small (quality variation below the minimum variation), this is because the dependence of the quality of the molded part on the captured cycle data is too small. If the variation is too large (quality variation above the maximum variation), a reliable prediction is obviously also not possible.

The fact that a quality or a quality datum of the molded part produced with the at least one further cycle is not reliably predictable can be understood to mean that the accuracy of the prediction with the present data and possibly the prediction model used is probably too low to be of use. For this, it is irrelevant that, in principle, there could be (e.g. more complicated or complex) models or data with which a reliable prediction is possible, or that the prediction for a cycle is accurate although the predictability criterion is not met.

It can preferably be provided that the cycle data and/or quality data are uniquely assigned in each case to a certain past cycle. However, tests by the applicant have shown that the method according to the invention can also check the predictability with a high degree of accuracy when the cycle data and the quality data are assigned only to certain groups of cycles (i.e. the information as to precisely which cycle a certain cycle datum or a certain quality datum occurred in is lost and is replaced by an approximate assignment to a group of cycles).

The past cycles can be cycles which were carried out immediately before the further cycle and/or which were carried out some time previously (for example during an earlier production batch).

The determination of the at least two nearest neighbors is based on a metric which defines a distance between the elements of the cycle data. By elements of the cycle data is meant those data which are assigned to a cycle (wherein—as stated above—it is not necessary to know which past cycle this actually was).

If, for example, three measured values are taken in each cycle, each element of the cycle data consists of three measured values. In this example, the distances between the elements are therefore to be determined in the three-dimensional space. In real molding processes, of course, many more than only three measured values are gathered per cycle, which is why, as a rule, the space of the cycle data has a great many more than three dimensions.

The distances in this space can be determined with the known p-norm, for example. The Euclidean norm ($p=2$, "normal" Euclidean geometry) or the 1-norm ($p=1$, Manhattan or Taxicab geometry) may be preferred.

The quality data can contain at least one (continuous or discrete, in particular binary) quality parameter.

The at least one quality parameter can be used as criterion for the quality of the molded parts produced, in particular for whether it is a good part or a reject part.

For this, it can be provided for example that operators predefine a permissible tolerance range, wherein the molded part is classified as a good part if the at least one quality parameter lies within this range and is classified as a reject part if the at least one quality parameter lies outside this range.

In particularly preferred embodiment examples, the method according to the invention is carried out in each new cycle while the molding machine is in operation.

Particularly preferably, the method according to the invention can be implemented in an automated manner and/or implemented by computer.

In addition to the information that a quality and/or a quality datum of the molded part produced with the at least one further cycle (at the current working point) is not reliably predictable, the first notification can, for example, contain possible reasons for the lack of predictability. Possible reasons for the lack of predictability could be, for example, an insufficient capture of quality or the fact that not all relevant process parameters are captured as cycle data.

Of course, the first notification does not need to state literally that a quality and/or a quality datum of the molded part produced with the at least one further cycle is not reliably predictable. What is meant is that the information is communicated that either the quality of the molded part produced with the at least one further cycle as a whole ("the quality") is not reliably predictable or one or more particular aspects of the quality (for example compliance with dimensional tolerances) is not reliably predictable. An aspect of the quality of a molded part can be quantified by a quality datum, for example as a quality parameter.

It can be provided that an evaluation of all those working points (cycle data) of the molding process and/or of the quality data for which the predictability criterion is not met is issued, and/or wherein changes in the relationships between the cycle data and the quality data over time are issued.

Protection is also sought for a computer-readable storage medium, on which a computer program product according to the invention is stored.

Furthermore, protection is sought for a molding machine which is set up for carrying out a molding process to be carried out in cycles and contains at least one memory and at least one processor unit, wherein a computer program product according to the invention is stored in the at least one memory and the at least one processor unit is set up for executing the computer program product according to the invention.

By molding machines can be meant injection molding machines, transfer molding machines, molding presses or the like.

The data collection is sometimes also referred to as a database.

It is to be noted that in some machine configurations several molded parts are produced in one cycle (e.g. in an injection mold with several mold cavities). Likewise, in the context of the invention more than one further cycle can be carried out, which are then checked as a group according to the invention. For the purposes of the present document and for the sake of simplicity the molded part is referred to in the singular. However, in particular in the cases described, the possibility of several molded parts, which are produced in the at least one further cycle, is also always to be understood by it.

Further advantageous embodiments of the invention are defined in the dependent claims. The optional measures described in connection with the method according to the invention can, of course, also be used in connection with the computer program product according to the invention or implemented therein.

It can be provided that the quality data of the past cycles are gathered by measurement on the molded parts and/or by human assessment of the molded parts.

The quality variation can be calculated as a—preferably normalized—difference between a maximum quality value of the at least two nearest neighbors and a minimum quality value of the at least two nearest neighbors. In this case, by the maximum quality value is meant a maximum value of the quality data of the cycles of the at least two nearest neighbors. Analogously, by the minimum quality value is meant a minimum value of the quality data of the cycles of the at least two nearest neighbors.

The quality variation of the quality data can be used in the checking of the predictability criterion in a form wherein the quality variation is correlated with a cycle data variation of the cycle data of the at least two nearest neighbors. For example, the quality variation can be divided by a cycle data variation before it is compared with the maximum variation or the minimum variation, in order to check the predictability criterion.

The cycle data variation can be calculated as a—preferably normalized—maximum distance between the at least two nearest neighbors.

In each case statistical variables of the cycle data and/or the quality data can be used for the normalization.

In the context of an anomaly check, it can be checked whether the current cycle data constitute an outlier and, if this is the case, a second notification can be issued, for example with the advice that the current cycle data have a significant deviation from the historical cycle data. The second notification can, of course, also be issued in the context of the variant of the invention.

The anomaly check can be carried out by means of angle-based outlier detection (ABOD).

Alternatively or in addition, in the context of the anomaly check, distances of the current cycle data from the cycle data (distances of the elements, as above) can be determined. For example, the current cycle data could be classified as outliers if a minimum of these distances is larger than a predefined limit value.

This limit value can be specified by an operator and/or be specified as a sensitivity parameter and/or the average distances of the cycle data. In this case, either all cycle data can be used or only the cycle data during a defined training phase.

In the present document, by sensitivity parameter is meant a value which is based on a maximum relative deviation and which can be calculated, for example, as an absolute deviation relative to an average deviation.

Alternatively or in addition, it can be provided that operators predefine a sampling rate, for example a number s of samples which are to be taken for each number Z of cycles, wherein Z could, for example, be fixed at 100, with the result that operators only have to input the number s of the samples (per 100 cycles).

It could then be provided that those of the Z cycles the cycle data of which have the largest distance from the remaining cycle data and/or the quality prognosis of which lies nearest to a limit of the permissible tolerance range are selected for taking a sample (wherein the quality of the molded part is checked by an operator and/or a device for gathering quality data).

The second notification can also contain information about which process parameters have made a large or the largest contribution to the current cycle data being classified as outliers. In particular, those process parameters which make a large or the largest contribution to the distance between the current cycle data and the cycle data could be identified.

The anomaly check can preferably be carried out before the check of the predictability criterion. If the anomaly check detects an outlier, then the predictability criterion no longer necessarily needs to be checked. In principle, however, the predictability criterion could be checked nevertheless.

The cycle data and/or the current cycle data can contain setting data for the molding machine, which are assigned to the past cycles or the at least one further cycle.

If the cycle data and the current cycle data contain setting data for the molding machine, in the context of a setting check it can be checked whether a setting distance between the setting data assigned to the at least one further cycle and the setting data of the cycle data is smaller than a predetermined maximum setting distance and, if this is not the case, a third notification can be issued. It is thus possible to detect whether and/or when the setting of the molding machine has changed significantly.

This maximum setting distance can be specified by an operator and/or be specified as a sensitivity parameter and/or the average distances of the setting data. In this case, either all setting data can be used or only the setting data during a defined training phase.

Alternatively or in addition, the setting check can also be effected separately for each setting parameter and/or for every other setting and it can be checked whether a setting in each case has been changed beyond a certain amount.

The setting check can preferably be carried out before the anomaly check and the check of the predictability criterion. The anomaly check and/or the check of the predictability criterion according to the invention can be carried out for example only when the setting check has detected no changes (e.g. going beyond the maximum setting distance) in the settings of the molding machine.

The cycle data and/or the quality data can be transformed and dimension-reduced and the transformed and dimension-reduced cycle data and/or the transformed and dimension-reduced quality data can be used for determining the at least two nearest neighbors and/or for checking the predictability criterion and/or the anomaly check, as a result of which the resources needed, for example for the determination of the nearest neighbors or the calculation of the quality variation, can be substantially reduced.

The transformed and dimension-reduced cycle data and/or quality data can also be used for the setting check and/or all other calculations or data evaluations of the data of the data collection.

The cycle data and/or the quality data can preferably be transformed and dimension-reduced by means of a multi-linear regression model, in particular a partial least squares regression and/or a principal component regression.

The cycle data and/or the current cycle data can contain process data, which are gathered during the past cycles and/or during the at least one further cycle by process measurement and/or reading out of a machine control system, wherein the process measurement and/or the reading out of the machine control system can be carried out on the molding machine itself or a molding system which contains the molding machine.

By process measurement can be meant any type of measurement whatsoever of a physical or chemical variable, which arises during the cycle.

The process data can contain time sequences of measured or read-out data which arise during the cycle, for example at a defined (or also variable) sampling interval. These time sequences can find their way directly into the cycle data and/or further cycle data. Alternatively or in addition, characteristic variables (for example maximum values, integrals etc.) can preferably be extracted from the time sequences and included in the data collection.

If the predictability criterion is met, a quality prognosis based on the cycle data and the quality data can be issued, for example in the form of at least one prognosis value for the at least one quality parameter.

The quality prognosis can be calculated by means of at least one of the following:
  arithmetic mean of the quality data of the cycles of the at least two nearest neighbors, preferably weighted according to distances between the at least two nearest neighbors and the current cycle data
  median of the quality data of the cycles of the at least two nearest neighbors
  multilinear regression model.

The multilinear regression model can be, for example, a so-called "partial least squares" regression (PLSR) or a principal component regression (PCR), which are known per se in the state of the art.

Combinations of arithmetic mean determination and a multilinear regression model are also possible, for example if the quality data contain more than one quality parameter.

Together with the quality prognosis, in particular the at least one prognosis value for the at least one quality parameter, a confidence range can be issued, within which the actual quality or the actual quality datum lies with predefined probability.

Alternatively or in addition, at least one of the following steps can be provided if the quality prognosis, in particular the at least one prognosis value, does not fall within the predefined tolerance range:
  issuing a fourth notification and/or
  activating a device for gathering quality data and/or
  prompting an operator to gather the quality data and/or
  actuating a reject gate and/or
  depositing at least one molded part produced in the at least one further cycle in an inspection tray and/or
  marking at least one molded part produced in the at least one further cycle.

This can be effected for at least one subsequent cycle, preferably several subsequent cycles.

The predefined tolerance band can, for example, be input by the operator and/or be based on desired quality requirements, data from the design phase of the molded part and/or of the mold, or the like.

If the predictability criterion is not met, at least one of the following steps can be carried out for at least one subsequent cycle—preferably several subsequent cycles:
  activating a device for gathering quality data and/or
  prompting an operator to gather the quality data and/or
  actuating a reject gate and/or
  depositing at least one molded part produced in the at least one further cycle in an inspection tray and/or
  marking at least one molded part produced in the at least one further cycle.

This means that it can be useful to request a sample of the quality of the molded parts produced if there is no predictability. This can be effected for a defined number of cycles.

It is to be noted that the first notification and/or the second notification and/or the third notification can be issued as a notification understandable by a human (e.g. text, graph and/or audio warning) or as a notification understandable by machines (e.g. only actuating the reject gate).

The device for gathering quality data can be, for example, an optical or infrared system for the automatic capturing of quality features of a molded part, which are actually known in the state of the art.

For example, if such a device is not present, an operator can also simply be prompted to check the quality data, for example by (optical or acoustic) issuing of an advice. In particular embodiments, the advice can also simply consist only of actuating the reject gate and as a result a molded part to be checked for quality passes to an operator or another person for checking the quality of the molded part.

It can be provided that
  an evaluation of all those working points (cycle data) of the molding process and/or of the quality data for which the predictability criterion is not met is issued, and/or
  changes in the relationships between the cycle data and the quality data over time are issued.

It can be provided that
  the current cycle data are added to the cycle data and/or,
  if current quality data—in particular those which are provided after a device for gathering quality data has been activated, after an operator has been prompted to gather the quality data and/or a reject gate has been actuated by an operator or the device for gathering quality data—are present for the at least one further cycle, the current quality data are added to the quality data.

As a result, the current cycle data and/or current quality data can already be available in the data collection for the following cycles in order to achieve a better prediction of the quality of the molded parts then produced. In this way, shifts in the working point of the molding process can be responded to simply, effectively and quickly.

Alternatively or in addition, cycle data and/or quality data can also be removed from the data collection again, for example if they already have a certain age—i.e. a long time has already passed, or many cycles have already been carried out since the data were obtained—and it can therefore no longer be expected that they are representative of the molding process in the current form.

In other words, the data collection can be adapted as follows:
  continuous overwriting of old cycle data and/or quality data with current cycle data and/or quality data when the distance between the old and the current cycle data and/or quality data is smaller than one or more predefined limit values (possibly separately for cycle data and quality data) and/or
  possibility of resetting the entire system in the event that significant changes have been carried out in the molding system and/or molding machine.

Here, the expression "overwriting" is naturally to be understood in the sense of transferring. Thus, the data are preferably not actually overwritten on the data carrier but are removed from the data collection in any way whatsoever and replaced by the current cycle data and quality data.

In this way, an effective monitoring of the molding process can be achieved without having to constantly retrain the model with changing underlying data using complicated techniques of machine learning. Instead, predictions about the quality of the currently produced molded part are made with constantly current data (so-called "lazy learning").

According to a preferred embodiment of the invention, the training can be effected simply by collecting the data. In this case, at least one of the following can be provided:
  a training mode, wherein cycles are carried out and the measured and/or gathered cycle data and/or quality data are added to the data collection and/or,
  if the distance between newly gathered and/or measured cycle data and already present (historic) cycle data does not exceed a predefined maximum distance, the newly gathered and/or measured cycle data are added to the cycle data and/or,
  if sample or other measurements or collections of the quality are carried out, these are added to the quality data, preferably with assignment to the respective cycle (and of course the cycle data of the cycle are added to the cycle data).

It can be provided that the data collection of cycle data and quality data and possibly an associated mathematical model (for example a multilinear regression model) for a configuration of a molding machine are stored and are available when production with this configuration is resumed. In the case of injection molding machines, a machine configuration could be given by a mold/material combination, for example.

Examples of variables which can be used as cycle data would be: maximum and arithmetic mean values of injection pressure, torque, injection times, metering times, injection pressure curve or the metering torque.

Moreover, cycle times, partial cycle times, parameters of peripheral devices (metering devices, external hot runner, temperature control devices) and/or parameters from other process monitoring systems or process assistance systems can for example be part of the cycle data.

Examples of quality data would be: molded part weight, dimensions or surface finish.

Within the meaning of the invention, the data collection can be stored locally in the molding machine. However, this is not strictly necessary. For example, the data collection can also be stored in a cloud storage.

Analogously to this, the processor unit which is intended to execute the computer program product according to the invention can also be arranged on the molding machine or be realized as a cloud computer.

Further advantages and details are revealed by the figures and the associated description of the figures. There are shown in:
  FIG. 1 a flow diagram of an embodiment example of a method according to the invention,
  FIGS. 2*a* and 2*b* two graphs to illustrate the partial least squares regression,
  FIG. 3 a graph to illustrate angle-based outlier detection,
  FIG. 4 a graph of a progression of an actual process parameter and one predicted by means of lazy learning,
  FIG. 5 a flow diagram for starting up and for operating a method according to the invention as well as
  FIG. 6 a schematic representation of a molding system according to the invention.

FIG. 1 first of all shows an overview flow diagram of an embodiment example of a method according to the invention. As soon as a cycle or at least part of the cycle (partial cycle) has finished, the method can begin.

It is to be noted that the required current cycle data, which contain setting data and process data, can be available as measured values or can be read out by a machine control system 3 of the molding machine 1 (see FIG. 6). The machine control system 3 of the molding machine 1 can also act as operator interface.

First of all, in the context of the "Input analysis—unknown setting parameters" (setting check), the setting data are checked as to whether they have a distance from the setting data which are present as part of the cycle data which is smaller than a predefinable maximum setting distance.

If that is not the case (decision branch N), the third notification can be issued, which notifies for example that a new process setting has been detected.

If the setting check produces a positive result (decision branch Y), the "Input analysis—anomaly detection" (anomaly check) is carried out next. In this case it is checked whether the current cycle data lie in a region close to the cycle data contained in the data collection (see FIGS. 2*a* and 2*b*). It is to be borne in mind that not only the setting data contained in the current cycle data and the cycle data but, as far as possible, all available (current) cycle data including all process data are compared with one another here.

If the anomaly check fails, i.e. an outlier is detected (decision branch N), a "Detailed analysis of the anomaly" (of the outlier) can optionally be carried out. If the method is still in a training phase, for example, the subsequent second notification can be suppressed or provided with a corresponding advice.

Subsequently, or in parallel with the detailed analysis of the anomaly, the second notification can be issued if an outlier is detected (decision branch N), in the form of a "Representation of the result via [the] process anomaly" in this embodiment example.

This can, for example, contain an analysis of the outlier which is displayed to operators on an operator interface of the molding machine—an injection molding machine (abbreviated to IMM) in this embodiment example—or on a PC, possibly via an internet-based customer portal of the manufacturer of the molding machine 1.

With the second notification, operators can also be prompted to check the quality of the molded part produced.

If no outlier is detected (decision branch Y), the check of the predictability criterion can be carried out.

If it becomes apparent that the predictability criterion is not met, the first notification is issued (not explicitly represented in the flow diagram from FIG. 1).

In this case, for example, a text message can simply be issued, according to which a quality and/or a quality datum of the molded part produced with the at least one further cycle is not reliably predictable (and therefore a quality monitoring is not available, or is available only to a limited extent, for this cycle).

Alternatively or in addition, at least one of the following steps can be carried out:
activating a device for gathering quality data and/or
prompting an operator to gather the quality data and/or
actuating a reject gate and/or
depositing at least one molded part produced in the at least one further cycle in an inspection tray and/or
marking at least one molded part produced in the at least one further cycle.

If the predictability criterion is not met (decision branch N), and if the model used to predict the quality or the quality datum or the corresponding data permit it, in this case a (further) extrapolated prediction of the quality or the quality datum could nevertheless be calculated and issued.

If the predictability criterion is met (decision branch Y), the quality prognosis can be created. This can preferably be effected by means of lazy learning.

It can also be provided that a "prognosis tolerance", i.e. a confidence range, is issued with the prognosis.

In this embodiment example it is also provided that the current cycle data are added to the cycle data ("Expansion of the input database"). It is to be noted that the data collection could also be referred to as a "database". The cycle data could also be referred to as "inputs".

However, adding the current cycle data does not have to be effected in all circumstances. For example, it could be effected only when there is a deviation (of a certain size) between the current cycle data and the cycle data. Alternatively, it can also be effected when, for example, an outlier has been detected but the operating staff have confirmed that it has still been a "normal" cycle.

Particular elements of the cycle data can also optionally be removed from the data collection.

Individual steps in the method described in connection with FIG. 1 are discussed in more detail a little further below.

As mentioned, the reject gate could optionally be actuated if, for example, a quality parameter or a quality score (as a prediction of a quality datum) and/or the corresponding confidence range lies outside the tolerance range for the quality of the molded part (could also be referred to as component part).

It is to be pointed out that the first notification, the second notification and the third notification do not have to be issued in chronological order. In preferred embodiments it is actually the case that at most one of these notifications is issued.

The method steps described in connection with FIG. 1 are described more specifically in the embodiment example described below. This is an injection molding process as an example of a molding process, wherein one or more molded parts 2 are produced in each cycle. The thus-produced molded part 2 or all of the molded parts 2 produced in a cycle can also be referred to as a unit or product.

The following data are gathered:
The injection molding machine records cycle-based individual values as well as time sequences (cycle data).
For the quality prediction, cycle-based features of the component part, for example a component part length or the weight, are also measured (quality data).

The type and number of recorded signals remains unchanged as far as possible over the runtime of the prognosis system.

In practice, quality measurements of the component parts are often taken manually and then only in samples. On the one hand, this is an important basis for the relevance of a quality prognosis. On the other hand, the system described here can also help to determine suitable cycles for the sampling. Finally, the calculations already contain a pure cycle-data analysis, which can also be utilized in order to evaluate the process, without quality measurements being necessary.

In this example, for each cycle
p different cycle-based values are recorded ($u_1, \ldots u_p$).
e.g. maximum and arithmetic mean values of injection pressure, torque, injection times, metering times, etc.
q different time sequences are taken with in each case s samples ($w_{1,1:s}, \ldots w_{q,1:s}$)
e.g. the injection pressure curve, the metering torque, etc.
as well as 1 value of the quality measurement (e.g. the component part weight).

Since the sample rate of the time sequences is very high, the data are downsampled by 1/f. Alternatively, only certain features can also be used from the time sequences, such as rise times, minima, maxima or average values.

The result is thus $$m = p + \left(q * \frac{s}{f}\right)$$

cycle values and 1 quality value for each cycle.

The system requires an initial database (i.e. the data collection) before anomalies can be detected and quality features can be predicted. On the one hand, this can be loaded, for example from an earlier production batch of the same molded part 2, or it can also be collected during the production time.

In the case of n samples (cycles) in the database, in total a basic dataset of n*m values plus n target values thus results (quality values of a quality parameter).

Data Preparation & Modelling for the Dimension Reduction

Since in all following calculations the absolute values of the individual signals are adopted in the model, it is advantageous to normalize the cycle data. This guarantees that fluctuations of all signals are adopted uniformly in the model irrespective of their unit. Well-established normalization methods, such as e.g. z-scores, or the normalization of the initial database to the range [0,1] or [−1,1] can be used for the normalization.

In order to then apply the system to new data (the current cycles), these current cycle data must be normalized with the same normalization parameters as the initial database. The normalization parameters are therefore also stored with them. For a normalization method with, for example, 2 parameters, that would be an additional 2*(p+q) values.

In the next step, the cycle data are transformed such that the number of their dimensions is greatly reduced and their most meaningful elements in relation to the target variance are emphasized.

In this embodiment example, this transformation is achieved by a partial least squares (PLS) regression model known per se, the fundamental properties of which will be briefly discussed in the following:

Like principal component analysis (PCA), PLS is a linear model $t(s)=\theta^T m(s)$ for describing fundamental relationships between two matrices (cycle and target data here), where t(s) quality feature (target) of the cycle s
$\theta^T$ parameter vector
m(s) cycle data of the cycle s.

An advantage over conventional linear regressions is that the calculation of θT is also possible in the case of linearly dependent variables (cycle data).

The parameter vector 8T is calculated as follows:
1. transformation into a new vector space $(\tilde{t}, \tilde{m})$: in this, the first entries in the vector $\tilde{m}$ describe the largest variance of the transformed target variable $\tilde{t}$,
2. selection of the most important $m_{PLS}$ entries (=components) in $\tilde{m}$,
3. calculation of the regression vector $\tilde{\theta}=(\tilde{M}_r^T\tilde{M}_r)^{-1}\tilde{M}_r^T\tilde{t}_r$, $\tilde{M}_r$ data matrix $(\tilde{M}_r=[\tilde{m}_r(s\_1),\tilde{m}_r(s\_2),\tilde{m}_r(S\_3) \ldots ])$,
4. inverse transformation of $\tilde{\theta}\rightarrow\theta$.

Steps 1 and 2 are important for the dimension reduction, wherein the reduced number of $m_{PLS}<m$ dimensions is a hyperparameter of the system, which can be predefined. Here, the index r denotes the dimension-reduced variables in the transformed space. The original basic dataset M with m*n values has thus been reduced to $\tilde{M}_r$ with $m_{PLS}$*n values.

Figure 2A:
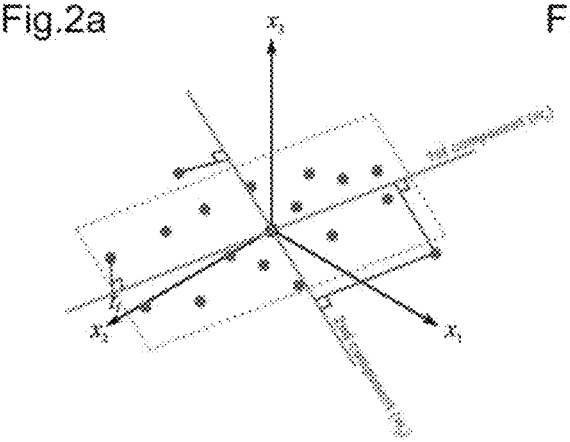
Figure 2B:
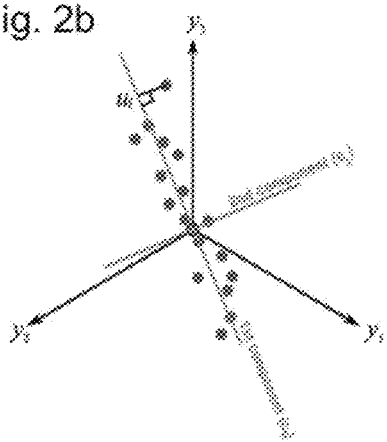

The ($m_{PLS}$) principal components describe the majority of the covariance between the two original spaces of the input and target parameters. This is illustrated in FIG. 2a and FIG. 2b (image source: learnche.org). The first two components are intended to explain the points in the input space (on the left) and in the target space (on the right), as well as the relationship between them, as well as possible. Moreover, they are orthogonal in the input space.

The PLS components do not correspond to any real signals of the machine but to a linear combination of the machine signals and form the basis of the new reduced-dimension space.

In this case, the number of $m_{PLS}$ components is one of the principal parameters of the system, which can either be set or else is determined automatically.

Whereas the number of cycle-based individual values p typically contains an order of magnitude of 50-500 cyclic parameters and the total number of cycle data m can reach several 10,000s in the case of included time sequence data at high sampling rates, the number of PLS components $m_{PLS}$ typically lies in the range of 10-20.

Through this step, a considerable dimension reduction can thus be achieved with a moderate loss of information.

The calculated PLS model is then utilized to project the input data onto the reduced(-dimension) space of the PLS components. All the following analyses are carried out in this space.

For the transformation of the original input data into the reduced-dimension space, a projection matrix with m*$m_{PLS}$ values is required in the next steps and is therefore stored.

Summary of the Stored Parameters

In the case of a database which comprises n cycles and 1 quality feature (target), the following values (all of them real decimal numbers) are required and therefore stored:

1. The transformed (projected onto PLS components) and normalized cycle database:
    a matrix with n*m values.
2. The target values which pertain to the cycles of the database
    a vector with n values (per target).
3. The untransformed database without normalization
    a matrix with n*m values.
4. The normalization parameters
    a matrix with 2*(p+q) values for the well-established z-score or MinMax normalization methods.
5. The projection matrix of the PLS model
    a matrix with m*$m_{PLS}$ values, wherein $m_{PLS}$ is a model parameter.

Outlier Detection (Anomaly Check)

During operation of the system a new set of cycle data is captured by the injection molding machine and connected peripheral devices for each cycle. These data are first normalized by the system using the stored normalization parameters. Then, the normalized cycle data are projected onto the space of the PLS components using the PLS model.

An analysis now begins, which is essentially intended to distinguish between two cases:
1) Does the point of the new cycle data in the PLS space lie near to already known points from the cycle database?
2) Does the point of the new cycle data in the PLS space lie outside already known regions?

In the first case, a prediction of the quality feature can be made on the basis of the current cycle data of the component part.

The second case corresponds to an outlier of the cycle data and a quality control of the component part of this cycle is to be recommended here. The captured quality value can then be added to the already known database with the cycle data in order to carry out a quality prognosis based on similar cycle data in the future.

Angle-based outlier detection (ABOD), for example, can be used for the anomaly check and thus for distinguishing between these two cases.

Here, in each case two straight lines are drawn from the new point to all possible pairs of elements of the database and the angle between them is determined. If the distribution of these angles is randomly and uniformly distributed, the new point lies in the middle of the already known data points (case 1). If all these angles are rather small, this means that the new point lies far outside the cluster of known points (case 2).

Figure 3:
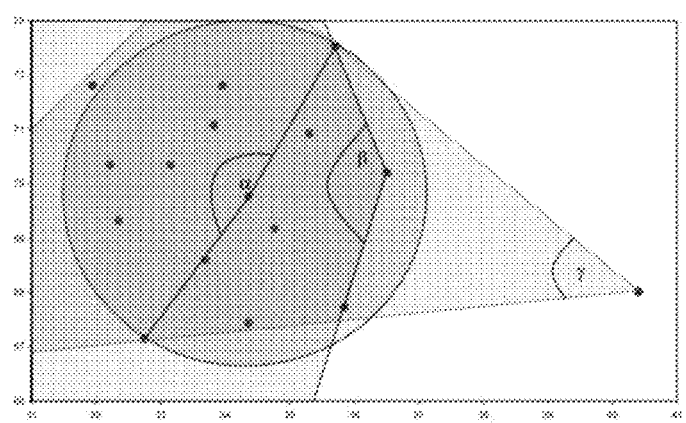

Angle-based outlier detection is illustrated in FIG. 3 (image source: researchgate.net). Whereas a point in the center of the cluster has an angular distribution of up to 180° and a certain breadth is still achieved even in the limit case (beta), the outlier is characterized by a narrowband angular distribution.

No Outlier: Checking of the Predictability Criterion and Possible Quality Prediction by Means of k Nearest Neighbors.

Thus, if the cycle data of a new cycle lie within a region in the space of the PLS components in which a sufficient number of (historical) cycle data already lie, the predictability criterion is checked and the quality value pertaining to the current cycle (the current quality datum) can be prognosticated. This is effected with the following method:
1. In the space of the PLS components, the distance of the current cycle data point from all points from the database is calculated. For this, different distance metrics can be used, such as the Manhattan metric or the Euclidean metric.

2. The k data points at the shortest distance from the new data point, referred to as the k nearest neighbors kNN, are selected.
3. The predictability criterion is now checked.
   a. The quotient $$V_Z = \frac{\max(dist(Z_{kNN}))}{quant_{95}(dist(Z))}$$

is calculated over the cycle data, wherein $\max(dist(Z_{kNN}))$ describes the maximum distance between the k nearest neighbors and $quant_{95}(dist(Z_{kNN}))$ denotes the $95^{th}$ percentile of the distances between the k nearest neighbors and all other cycle data.

b. In the second step, the quotient $$V_Q = \frac{\max(Q_{kNN}) - \min(Q_{kNN})}{quant_{95}(Q) - quant_5(Q)}$$

is calculated on the quality data. In this case, $\min(Q_{kNN})$ and $\max(Q_{kNN})$ describe the minimum and maximum quality values of the k nearest neighbors and $quant_5(Q_{kNN})$ and $quant_{95}(Q_{kNN})$ describe the $5^{th}$ and $95^{th}$ percentiles, respectively, of all quality values in the database.

If the quotient $$V_V = \frac{V_Z}{V_Q}$$

now lies at a defined interval around 1, then the predictability criterion is met. In this case, $V_V<1$ suggests a relatively large variation in the quality data of the nearest neighbors and thus an unreliable predictability, while $V_V>1$ indicates a relatively strong variation in the cycle data of the nearest neighbors and thus an insufficient relationship between quality data and cycle data in this environment. The interval around 1 is defined with the parameter e to give $[1-\varepsilon, 1+\varepsilon]$.

4. If the predictability criterion is not met, then a notification is issued that the quality datum at the current working point of the molding process is not reliably predictable.
5. If the predictability criterion is met, then the prognosticated quality feature can be calculated, e.g. as the distance-weighted mean of the quality values of the k nearest neighbors:

$$Q_{pred} = \frac{\sum_{i=1}^{k} \frac{Q_i}{dist_i^2}}{\sum_{i=1}^{k} \frac{1}{dist_i^2}}$$

The parameter k, thus the number of nearest neighbors, is a principal parameter of the algorithm, along with $m_{PLS}$, the number of PLS components.

It is to be expected that the parameter c can be chosen universally. In the present embodiment example, very good results were achieved with $\varepsilon=0.1$.

Outlier: Adding One/Several New Samples to the Database

If there is an outlier in the data of a new cycle it can be added to the database as described below. The algorithm thus learns new working points of the modeled injection molding process for this.

In the case of an outlier of the cycle data or of a data point in an environment not yet sufficiently described, a quality assessment of the component part is requested by the system. This can be effected either as an advice to the user or also as a trigger of an automatic quality-measuring system or a reject gate.

The algorithm thus assists in the taking of suitable samples as it recommends quality measurements above all when the cycle data are not yet known from the history.

In this case, the complete dataset of the cycle of m+1 raw values (m cycle values and 1 quality value) is stored exactly like the $m_{PLS}$ values which describe the cycle data point in the transformed space.

The system already has the expanded database available to it in the next cycle for the analysis of the cycle data as well as the quality prognosis.

Note: assuming that the cycle data and the quality values do not change abruptly in the injection molding process, a few new data points can be added to the database before the normalization parameters and the PLS model have to be recalculated.

After an outlier, it is also useful to carry out several quality measurements one after the other and to expand the database by the new cycle data and quality values. This serves on the one hand to ensure that the quality of the component part is fine (even outside the working points of the process known historically to the system) and on the other hand to quickly and comprehensively represent a new working point of the cycle data in the database. The number of nearest neighbors k can e.g. be used as the minimum number of new quality measurements needed.

Removing an Element from the Data Collection/Database

In order to minimize the computing time and the storage space of the system, it is useful not to allow the number of data points in the database to grow arbitrarily. For this, the current data point can replace an old one from the database with the aim of representing all existing working areas of the process uniformly.

This is guaranteed when the following criteria (1)-(3) are met, wherein the k nearest neighbors have to be determined in the first step.

(1) Does the current measured quality value lie between the minimum and maximum values of the measured quality values of the k nearest neighbors?

(2) Is the relationship $$\frac{\max(distance(Z_i, Z_{kNN}))}{\max(distance(Z_i, Z))}$$

smaller than a set limit value $G_Z \varepsilon [0,1]$? Here, $\max(distance(Z_i, Z_{kNN}))$ denotes the maximum distance between the current cycle data and the k nearest neighbors in the space of the PLS components and $\max(distance(Z_i, Z))$ denotes the maximum distance between the current cycle data and the cycle data in the space of the PLS components.

(3) Is the relationship $$\frac{\max(\text{distance}(Q_i, Q_{kNN}))}{\max(\text{distance}(Q_i, Q))}$$

smaller than a set limit value $G_Q \varepsilon [0,1]$? Here, max(distance $(Q_i, Q_{kNN})$) denotes the maximum distance between the current quality value and the quality values of the k nearest neighbors and max(distance$(Q_i, Q)$) denotes the maximum distance between the current quality value and the quality data.

If all these criteria are met, then the nearest neighbor at the shortest distance from the current cycle values in the space of the PLS components is replaced by the new one. Instead of using the maximum values, in each case the $95^{th}$ percentiles can also be used in order to suppress the influence of incorrect measured values.

Further Samples

If, in addition to the cycles proposed by the system on the basis of outliers, samples of the quality values are taken (e.g. on the basis of a defined test plan), then these cycles can be added to the database taking into consideration the method described for minimizing the number of data points.

Here, the analysis of the new quality value can be recommended, namely whether it lies in the interval $[(1-a)*\min(Q_{kNN}), (1+a)*\max(Q_{kNN})]$, wherein $\min(Q_{kNN})$ and $\max(Q_{kNN})$ describe the minimum and maximum quality values of the k nearest neighbors of the cycle values of the cycle pertaining to the quality value. The parameter a is introduced in order to be able to compensate for measurement inaccuracies.

If the quality value lies outside this interval, then a new sample is to be requested and then it is to be checked whether this new quality value lies within the interval, possibly for a new set of k nearest neighbors. If this is met, then the cycle data and the quality value of the new cycle are added to the database and those of the first sample are discarded. Otherwise, it is to be assumed that the relationships between cycle data and quality values in the process have shifted and the model needs to be adapted. For this, samples can be taken and the elements from the database overwritten with the new elements e.g. until the quality value of the sample again lies in the interval $[(1-a)*\min(Q_{kNN}), (1+a)\max(Q_{kNN})]$.

Determining the Parameters $m_{PLS}$ and k

The two principal parameters of the algorithm, the number of PLS components $m_{PLS}$ and the number of nearest neighbors k can be set by the operator or also determined automatically.

However, automatic determination is associated with a greater computing time and is effected by means of grid search over the two parameters and cross-validation. For the grid search, minimum and maximum values of the parameters ($m_{PLS_{min}}$ and $m_{PLS_{max}}$ as well as $k_{min}$ and $k_{max}$), and the number of values to be examined for each parameter, are specified.

During the cross-validation, the available database is partitioned into $n_{cv}$ equally sized and randomly distributed blocks of samples. Now, in $n_{cv}$ rounds, in each case one of these blocks is treated like a set of new cycle data and a quality prognosis is created. Since the quality data of these samples are already known, the deviation of the prognosis from the actual value can be calculated. The mean absolute error (MAE) of these $n_{cv}$ passes is an indicator of the quality of the prognosis of the present database-parameter combination.

Grid search now means that this calculation is carried out for every combination of k and $m_{PLS}$ in the specified parameter range.

The parameter set ($m_{PLS}$ and k) with the lowest MAE is ultimately selected.

In order to obtain a high degree of model quality during operation even in the case of larger shifts of the working points of the process, the parameters $m_{PLS}$ and k can be recalculated with the in each case current database after specified time periods (e.g. every 6 hours), after a specified number of cycles or after a specified number of added samples (quality samples).

However, this is only useful when additional quality samples have also been added to the database since the parameters were last determined. Since as a rule this calculation is computationally intensive because of the grid search, it can be useful to carry it out on an external computing device (e.g. on a separate computing cluster in the cloud) and to restore the optimum parameters $m_{PLS}$ and k to the quality-monitoring system.

Figure 4:
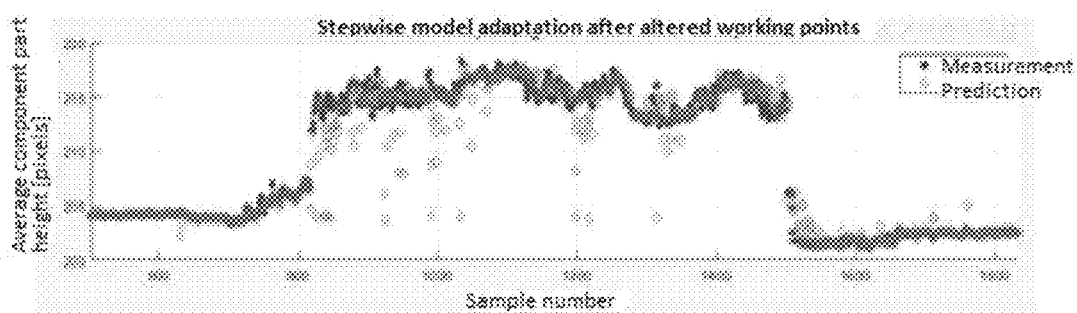

However, the method presented here exhibits very robust behavior vis-à-vis shifts in the working point of a molding process, regarding which reference is made to FIG. 4. Therein, an actual quality parameter (average height of the molded part 2) and a quality parameter predicted with the above system are plotted against the number of cycles.

As can be seen, a relatively strong change in the working point of the molding process has already been virtually entirely compensated for after approximately 100 cycles (i.e. the new working point has essentially been "learned").

Figure 5:
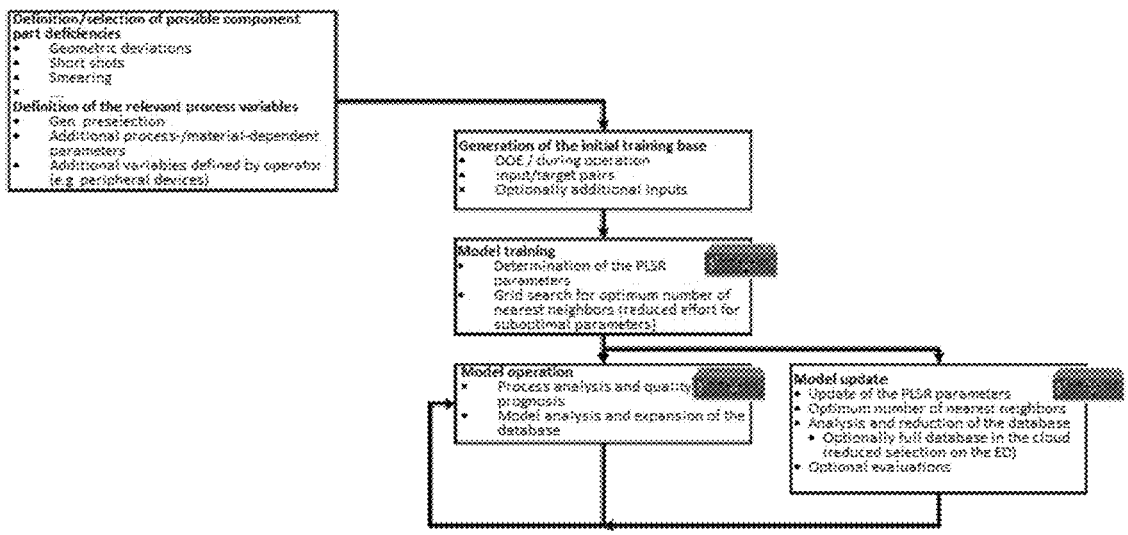

FIG. 5 shows a flow diagram for starting up and for operating a method according to an embodiment example of the invention.

In principle, it is preferred first of all actually to define the possible quality deficiencies ("component part deficiencies") and the relevant process parameters ("process variables"), wherein in each case examples are mentioned in FIG. 5.

Then, an initial training base can be generated as basic data collection. Thereafter, the training of the model can begin (regarding this see the determination of the parameters $m_{PLS}$ and k above).

Thereafter, the actual method can be carried out during operation of the molding machine.

In parallel to this, the adaptation of the data collection and/or of the model can be carried out.

ED abbreviates "edge device". DOE abbreviates "design of experiments".

FIG. 6 shows, schematically, an embodiment example according to the invention of a molding machine 1 as part of a molding system.

In this embodiment example, the molding machine 1 is an injection molding machine. A mold 8, which is fundamentally separate from the injection molding machine and can be changed, is mounted on the injection molding machine.

In each cycle, a schematically represented molded part 2 is produced.

A reject gate 5 is provided in this embodiment example.

A device 4 for gathering quality data is also provided. This could be implemented for example as a weighing machine and/or an optical camera or infrared camera.

A computing unit with a memory 6 and a processor unit 7 is likewise provided. The computing unit can, for example, be designed as a cloud computer. However, in preferred embodiments, the computing unit—thus the memory 6 and the processor unit 7—is part of the machine control system 3 of the molding machine.

During operation—thus while cycles are being carried out repeatedly—the method described in connection with FIG. 1 is carried out, for example.

If the predictability criterion is not met in a particular cycle, the reject gate can be activated for example, with the result that the molded part 2 produced passes via the path R to the device 4 for gathering quality data. Specifically, the molded part 2 could be deposited in an inspection tray 9 of the device 4 for gathering quality data. It is then conceivable that the device 4 for gathering quality data is activated automatically, as soon as a molded part 2 is deposited in the inspection tray 9, or that the device 4 for gathering quality data is activated via a separate activation signal.

If the predictability criterion is already met, the molded part 2 can proceed normally as an assumed good part via the path G.

Paths R and G are labelled referring to the terms "reject" and "good part". However, it can of course be the case that the predictability criterion is not met and the molded part 2 nevertheless meets the requirements in relation to quality, thus is a good part. This molded part 2 can then simply be delivered to path G.

In this design it is not necessary for the device 4 for gathering quality data always to be active and check every molded part 2. It is thereby also possible to use devices 4 which require more time than the duration of a cycle in order to gather the quality data.

Of course, in principle other designs are also conceivable. For example, instead of a device 4 for gathering quality data, a person could also gather the quality of the molded part 2.

LIST OF REFERENCE NUMBERS

Molding machine 1
Molded part
Machine control system 3
Device for gathering quality data 4
Reject gate 5
Memory 6
Processor unit 7
Mold 8
Inspection tray 9

The invention claimed is:

1. A method for monitoring a molding process carried out in cycles, wherein a data collection is provided which contains at least the following data:
   in each case cycle data of the molding process carried out on a molding machine for past cycles, and
   quality data from molded parts produced using the molding machine for at least some of the past cycles,
   and wherein, with the molding machine, at least one further cycle of the molding process is carried out as well as current cycle data of the at least one further cycle are gathered, wherein the following further steps are carried out:
   determining at least two nearest neighbors in the form of the cycle data from at least two of the past cycles, such that the cycle data of the at least two nearest neighbors lie nearer to the current cycle data than the cycle data which do not pertain to the at least two nearest neighbors, wherein only those past cycles for which quality data are contained in the data collection are used for the determination of the at least two nearest neighbors,
   checking a predictability criterion, wherein it is checked whether a quality variation of the quality data of the cycles of the at least two nearest neighbors is smaller than a maximum variation and/or larger than a minimum variation and,
   if the predictability criterion is not met, issuing a first notification that a quality and/or a quality datum of the molded part produced with the at least one further cycle is not reliably predictable.

2. The method according to claim 1, wherein the quality variation is calculated as a—preferably normalized—difference between a maximum quality value of the at least two nearest neighbors and a minimum quality value of the at least two nearest neighbors.

3. The method according to claim 1, wherein the quality variation of the quality data is used in the checking of the predictability criterion in a form wherein the quality variation is correlated with a cycle data variation of the cycle data of the at least two nearest neighbors.

4. The method according to claim 3, wherein the cycle data variation is calculated as a—preferably normalized—maximum distance between the at least two nearest neighbors.

5. The method according to claim 1, wherein, if the prediction criterion is met, a quality prognosis based on the cycle data and the quality data is calculated and issued.

6. The method according to claim 5, wherein the quality prognosis is calculated by at least one of the following:
   arithmetic mean of the quality data of the cycles of the at least two nearest neighbors,
   median of the quality data of the cycles of the at least two nearest neighbors,
   multilinear regression model.

7. The method according to claim 5, wherein, if the quality prognosis lies outside a predefined tolerance range, at least one of the following steps is carried out for at least one subsequent cycle-preferably several subsequent cycles:
   activating a device for gathering quality data and/or
   prompting an operator to gather the quality data and/or
   actuating a reject gate and/or
   depositing at least one molded part produced in the at least one further cycle in an inspection tray and/or
   marking at least one molded part produced in the at least one further cycle.

8. The method according to claim 1, wherein, if the predictability criterion is not met, at least one of the following steps is carried out for at least one subsequent cycle—preferably several subsequent cycles:
   activating a device for gathering quality data, and/or
   prompting an operator to gather the quality data, and/or
   actuating a reject gate, and/or
   depositing at least one molded part produced in the at least one further cycle in an inspection tray and/or
   marking at least one molded part produced in the at least one further cycle.

9. The method according to claim 1, wherein
   in the context of an anomaly check, it is checked whether the current cycle data constitute an outlier and,
   if this is the case, a second notification is issued.

10. The method, in particular according to claim 1, for monitoring a molding process carried out in cycles, wherein a data collection is provided which contains at least the following data:
    in each case cycle data of the molding process carried out on a molding machine for past cycles and
    quality data from molded parts produced using the molding machine for at least some of the past cycles, and wherein, with the molding machine-, at least one further cycle of the molding process is carried out as well as current cycle data of the at least one further cycle are gathered, wherein, in the context of an anomaly check, it is checked whether the current cycle data constitute an outlier and, if this is the case, at least one of the following steps is carried out for at least one subsequent cycle-preferably several subsequent cycles:

activating a device for gathering quality data and/or
prompting an operator to gather the quality data and/or
actuating a reject gate and/or
depositing at least one molded part produced in the at least one further cycle in an inspection tray and/or
marking at least one molded part produced in the at least one further cycle.

11. The method according to claim 9, wherein the anomaly check is carried out by means of angle-based outlier detection.

12. The method according to claim 1, wherein the quality data of the past cycles are gathered by measurement on the molded parts and/or by human assessment of the molded parts.

13. The method according to claim 1, wherein the cycle data and/or the current cycle data contain setting data for the molding machine, which are assigned to the past cycles or to the at least one further cycle, respectively.

14. The method according to claim 13, wherein the cycle data and the current cycle data contain setting data of the molding machine, wherein, in the context of a setting check, it is checked whether a setting distance between the setting data assigned to the at least one further cycle and the setting data of the cycle data is smaller than a predetermined maximum setting distance and,
if this is not the case, a third notification is issued.

15. The method according to claim 1, wherein the cycle data and/or the quality data are transformed and dimension-reduced and in that the transformed and dimension-reduced cycle data and/or the transformed and dimension-reduced quality data are used for the determination of the at least two nearest neighbors and/or for the checking of the predictability criterion and/or the anomaly check.

16. The method according to claim 15, wherein the cycle data and/or the quality data are transformed and dimension-reduced by a multilinear regression model, in particular a partial least squares regression and/or a principal component regression.

17. The method according to claim 1, wherein the cycle data and/or the current cycle data contain process data, which are gathered during the past cycles and/or during the at least one further cycle by process measurement and/or reading out of a machine control system, wherein the process measurement and/or the reading out of the machine control system is carried out on the molding machine itself or a molding system which contains the molding machine.

18. The method according to claim 1, wherein
the current cycle data are added to the cycle data and/or,
if current quality data are present for the at least one further cycle, the current quality data are added to the quality data.

19. A molding machine for carrying out the method according to claim 1, the molding machine being set up for carrying out a molding process to be carried out in cycles and contains at least one memory and at least one processor unit, wherein a computer program product is stored in the at least one memory and the at least one processor unit is set up for executing the computer program product.

20. A computer program product for monitoring a molding process carried out in cycles, in particular for carrying out a method according to claim 1, wherein the computer program product contains instructions for accessing a data collection and the data collection contains at least the following data:

in each case cycle data of the molding process carried out on a molding machine for past cycles,
quality data from molded parts produced using the molding machine for at least some of the past cycles, and
current cycle data from at least one further cycle of the molding process carried out using the molding machine, wherein the computer program product contains further instructions for carrying out the following steps:

determining at least two nearest neighbors in the form of the cycle data from at least two of the past cycles, such that the cycle data of the at least two nearest neighbors lie nearer to the current cycle data than the cycle data which do not pertain to the at least two nearest neighbors, wherein only those past cycles for which quality data are contained in the data collection are used for the determination of the at least two nearest neighbors,
checking a predictability criterion, wherein it is checked whether a quality variation of the quality data of the cycles of the at least two nearest neighbors is smaller than a maximum variation and/or larger than a minimum variation and,
if the predictability criterion is not met, issuing a first notification that a quality and/or a quality datum of the molded part produced with the at least one further cycle is not reliably predictable.

21. A computer program product according to claim 20, for monitoring a molding process carried out in cycles, wherein the computer program product contains instructions for accessing a data collection, and the data collection contains at least the following data:

in each case cycle data of the molding process carried out on a molding machine for past cycles,
quality data from molded parts produced using the molding machine for at least some of the past cycles, and
current cycle data from at least one further cycle of the molding process carried out using the molding machine, wherein the computer program product contains further instructions for carrying out the following steps:

carrying out an anomaly check, wherein it is checked whether the current cycle data constitute an outlier and,
if this is the case, initiating at least one of the following steps for at least one subsequent cycle—preferably several subsequent cycles:
activating a device for gathering quality data and/or
prompting an operator to gather the quality data and/or
actuating a reject gate and/or
depositing at least one molded part produced in the at least one further cycle in an inspection tray and/or
marking at least one molded part produced in the at least one further cycle.

22. A computer-readable storage medium in which a computer program product according to claim 20 is stored.

* * * * *